(12) United States Patent
Hioda (10) Patent No.: US 10,994,690 B2
(45) Date of Patent: May 4, 2021

(54) VEHICLE SIDE AIRBAG DEVICE

(71) Applicant: TOYOTA JIDOSHA KABUSHIKI KAISHA, Toyota (JP)

(72) Inventor: Seiji Hioda, Tokai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 76 days.

(21) Appl. No.: 16/148,277

(22) Filed: Oct. 1, 2018

(65) Prior Publication Data

US 2019/0143930 A1 May 16, 2019

(30) Foreign Application Priority Data

Nov. 13, 2017 (JP) .............................. JP2017-218666

(51) Int. Cl.
| | |
|---|---|
| *B60R 21/233* | (2006.01) |
| *B60R 21/207* | (2006.01) |
| *B60R 21/231* | (2011.01) |
| *B60R 21/00* | (2006.01) |
| *B60R 21/26* | (2011.01) |

(52) U.S. Cl.
CPC .......... *B60R 21/233* (2013.01); *B60R 21/207* (2013.01); *B60R 21/23138* (2013.01); *B60R 21/26* (2013.01); *B60R 2021/0032* (2013.01); *B60R 2021/0044* (2013.01); *B60R 2021/0058* (2013.01); *B60R 2021/23146* (2013.01); *B60R 2021/23324* (2013.01)

(58) Field of Classification Search
CPC ............ B60R 21/207; B60R 21/23138; B60R 21/233; B60R 2021/23146; B60R 2021/23308; B60R 2021/23324
See application file for complete search history.

(56) References Cited

U.S. PATENT DOCUMENTS

| | | | | |
|---|---|---|---|---|
| 5,722,685 A | * | 3/1998 | Eyrainer ........... | B60R 21/23138 280/730.2 |
| 6,378,896 B1 | * | 4/2002 | Sakakida ................ | B60R 21/21 280/296 |
| 2007/0013174 A1 | * | 1/2007 | Riedel ................... | B60R 21/233 280/730.2 |
| 2008/0079248 A1 | | 4/2008 | Hayashi | |

(Continued)

FOREIGN PATENT DOCUMENTS

| | | |
|---|---|---|
| JP | H09-039710 A | 2/1997 |
| JP | H11-152005 A | 6/1999 |

(Continued)

*Primary Examiner* — Barry Gooden, Jr.
(74) *Attorney, Agent, or Firm* — Oliff PLC (57) ABSTRACT

A vehicle side airbag device including an airbag accommodated within a seatback of a vehicle seat, and inflates and expands between a seated vehicle occupant and a side door, the airbag includes: a main body portion configured to restrain at least from a shoulder portion to a chest region of the seated vehicle occupant; and an extension portion configured to extend toward a vehicle front side or a vehicle rear side at a portion of a height region of the main body portion, and wherein, as seen in a vehicle side view, at a vehicle occupant shoulder portion height region, the extension portion overlaps a vehicle side portion member that structures a portion of a vehicle cabin side wall and that projects-out further toward a vehicle inner side than a side door glass.

10 Claims, 8 Drawing Sheets

(56) References Cited

U.S. PATENT DOCUMENTS

| | | | |
|---|---|---|---|
| 2010/0201108 A1* | 8/2010 | Iwayama | B60R 7/046 280/730.2 |
| 2011/0012330 A1 | 1/2011 | Sato et al. | |
| 2012/0235388 A1* | 9/2012 | Suzuki | B60R 21/233 280/730.2 |
| 2012/0326420 A1 | 12/2012 | Katsumata | |
| 2014/0084571 A1* | 3/2014 | Hotta | B60R 21/233 280/729 |
| 2014/0210192 A1* | 7/2014 | Hotta | B60R 21/23138 280/730.2 |
| 2015/0014970 A1* | 1/2015 | Fujiwara | B60R 21/23138 280/730.2 |
| 2015/0158453 A1* | 6/2015 | Fujiwara | B60R 21/207 280/730.2 |
| 2015/0274117 A1* | 10/2015 | Iida | B60R 21/26 280/729 |
| 2015/0367806 A1 | 12/2015 | Fujiwara | |
| 2016/0114757 A1* | 4/2016 | Fujiwara | B60R 21/23138 280/729 |
| 2016/0200279 A1* | 7/2016 | Scherr | B60R 21/23138 280/729 |
| 2016/0229370 A1* | 8/2016 | Hampson | B60R 21/232 |
| 2016/0368449 A1* | 12/2016 | Fujiwara | B60R 21/231 |
| 2018/0222435 A1* | 8/2018 | Fukawatase | B60R 21/2338 |
| 2019/0135219 A1* | 5/2019 | Kobayashi | B60R 21/2338 |
| 2019/0193667 A1* | 6/2019 | Hioda | B60R 21/23138 |
| 2019/0241146 A1* | 8/2019 | Okada | B60R 21/239 |
| 2019/0283700 A1* | 9/2019 | Kwon | B60R 21/233 |

FOREIGN PATENT DOCUMENTS

| | | |
|---|---|---|
| JP | 2008-080996 A | 4/2008 |
| JP | 2011-020502 A | 2/2011 |
| JP | 2014-141159 A | 8/2014 |
| JP | 2015-013500 A | 1/2015 |
| JP | 2015-104987 A | 6/2015 |
| JP | 2015-110373 A | 8/2015 |
| WO | 2011/108069 A1 | 9/2011 |

* cited by examiner

VEHICLE SIDE AIRBAG DEVICE

CROSS-REFERENCE TO RELATED APPLICATION

This application claims priority under 35 USC 119 from Japanese Patent Application No. 2017-218666, filed on Nov. 13, 2017, the disclosure of which is incorporated by reference herein.

BACKGROUND

Technical Field

The present invention relates to a vehicle side airbag device.

Related Art

There is known a vehicle side airbag device having an airbag that is accommodated within the seatback of a vehicle seat and that, at the time of a side collision, inflates and expands between a seated passenger and a side door.

By the way, there are the following points in a case in which a side airbag device is applied to a vehicle at which the beltline of the side door is lower than the shoulder portion of the seated vehicle occupant. Namely, because the vehicle occupant shoulder portion is positioned further upward than the door trim, the portion of the side airbag which portion restrains the shoulder portion (the shoulder portion restraining portion) cannot obtain reaction force from the door trim, and there is the possibility that the vehicle occupant shoulder portion will not be able to be restrained appropriately.

Thus, in the vehicle side airbag device disclosed in Japanese Patent Application Laid-Open (JP-A) No. 2015-104987, a second airbag, which communicates via a communicating hole of a partitioning wall cloth, is provided at the side door side of the upper portion of a first airbag. Due thereto, the shoulder portion restraining portion obtains reaction force from the side door glass or the collision object.

However, since the device of JP-A No. 2015-104987 is structured such that it attempts to obtain reaction force from a side door glass or a collision object, there is the possibility that the appropriate reaction force will not be able to be obtained, in a case in which the side door glass breaks or depending on the exact manner of the collision with the collision object or the like.

SUMMARY

The present disclosure provides a vehicle side airbag device that may appropriately restrain a vehicle occupant shoulder portion at the time of a side collision, even in a case in which the door beltline is lower than the shoulder portion of a seated vehicle occupant.

A first aspect of the present disclosure is a vehicle side airbag device including an airbag accommodated within a seatback of a vehicle seat, and inflates and expands between a seated vehicle occupant and a side door, the airbag including: a main body portion configured to restrain at least from a shoulder portion to a chest region of the seated vehicle occupant; and an extension portion configured to extend toward a vehicle front side or a vehicle rear side at a portion of a height region of the main body portion, and wherein, as seen in a vehicle side view, at a vehicle occupant shoulder portion height region, the extension portion overlaps a vehicle side portion member that structures a portion of a vehicle cabin side wall and that projects-out further toward a vehicle inner side than a side door glass.

In the vehicle side airbag device of the first aspect, the airbag that inflates and expands between a seated vehicle occupant and a side door is accommodated within the seatback of the vehicle seat. The airbag includes a main body portion that restrains at least from the shoulder portion to the chest region of the seated vehicle occupant.

Moreover, the airbag includes an extension portion. The extension portion is a portion where the airbag is extended toward the vehicle front side or the vehicle rear side, at a portion of the height region of the main body portion. As seen in a vehicle side view, at the vehicle occupant shoulder portion height region, this extension portion overlaps a vehicle side portion member (a member that structures a portion of a side wall of the vehicle cabin and that projects-out further toward the vehicle inner side than the side door glass). Accordingly, in the airbag of the first aspect, reaction force is obtained appropriately from the vehicle side portion member by the extension portion at the vehicle occupant shoulder portion height region. Therefore, the vehicle occupant shoulder portion may be restrained appropriately.

Note that, in a case in which the vehicle seat is slidable in the vehicle longitudinal direction, a state in which the vehicle seat is positioned at a usual position at the time of a side crash test is assumed. Further, as the seated vehicle occupant, a seated vehicle occupant corresponding to an AM50 (50th percentile U.S. adult male) internationally standardized side crash dummy (World Side Impact Dummy: World SID) is assumed.

In a second aspect of the present disclosure, in the above-described first aspect, the vehicle side portion member may be a pillar that is positioned at a vehicle rear side of the seated vehicle occupant; and the extension portion may be configured to extended toward the vehicle rear side from the main body portion.

In the vehicle side airbag device of the second aspect, the extension portion, which is extended toward the vehicle rear side from the main body portion, can obtain reaction force by abutting the pillar that is positioned at the vehicle rear side of the seated vehicle occupant.

In a third aspect of the present disclosure, in the above-described second aspect, the airbag may include a partitioning wall cloth that sections an interior of the airbag into a front chamber and a rear chamber, and in which a communication hole is formed; an inflator may be disposed at an interior of the rear chamber; and the extension portion may be structured as a portion of the rear chamber.

In the vehicle side airbag device of the third aspect, the airbag has a partitioning wall cloth that sections the interior of the airbag into a front chamber and a rear chamber, and in which a communication hole is formed. An inflator is disposed at the interior of the rear chamber, and the extension portion is structured as a portion of the rear chamber. Therefore, in the vehicle side airbag device of the third aspect, reaction force may be obtained from the pillar at a portion of the rear chamber that has high pressure, and the vehicle occupant shoulder portion may be restrained even more effectively.

In a fourth aspect of the present disclosure, in the above-described third aspect, the rear chamber may restrain the shoulder portion of the seated vehicle occupant.

In the vehicle side airbag device of the fourth aspect, the extension portion is structured as a portion of the rear chamber, and the rear chamber restrains the vehicle occupant shoulder portion. Namely, of the airbag, the portion that restrains the vehicle occupant shoulder portion and the portion that receives reaction force from the pillar are both the rear chamber that has high pressure. Therefore, the vehicle occupant shoulder portion may be restrained appropriately by the reaction force that is received from the pillar.

In a fifth aspect of the present disclosure, in the above-described first aspect, the vehicle side portion member may be a division bar that is positioned at a vehicle front side of the seated vehicle occupant, and the extension portion may be a portion that is extended toward the vehicle front side from the main body portion, and at the vehicle occupant shoulder portion height region, a thickness of the extension portion toward a vehicle transverse direction outer side may be made to be greater than a thickness of the main body portion.

In the vehicle side airbag device of the fifth aspect, the vehicle side portion member, which overlaps the airbag as seen in a side view due to the provision of the extension portion, is a division bar that is positioned at the vehicle front side of the seated vehicle occupant. Further, at the vehicle occupant shoulder portion height region, the thickness of the extension portion toward the vehicle transverse direction outer side is greater than that of the main body portion. Therefore, in the vehicle side airbag device of the fifth aspect, reaction force may be obtained appropriately by the division bar that is in a positional relationship of being recessed toward the vehicle transverse direction outer side with respect to the door trim and the like.

As described above, in accordance with the present disclosure, a vehicle occupant shoulder portion may be restrained appropriately at the time of a side collision, even in a case in which the door beltline is lower than the shoulder portion of the seated vehicle occupant.

BRIEF DESCRIPTION OF THE DRAWINGS

Exemplary embodiments will be described in detail based on the following figures, wherein.

DETAILED DESCRIPTION

First Exemplary Embodiment

A side airbag device 20 relating to a first exemplary embodiment of the present disclosure is described hereinafter by using FIG. 1 through FIG. 4.

Note that arrow FR, arrow UP and arrow OUT that are marked appropriately in the respective drawings indicate the frontward direction (advancing direction), the upward direction and a vehicle transverse direction outer side of the vehicle, respectively. Hereinafter, when explanation is given by merely using longitudinal, left-right and vertical directions, they refer to the longitudinal of the vehicle longitudinal direction, the left and right of the vehicle left-right direction (the vehicle transverse direction), and the vertical of the vehicle vertical direction, unless otherwise indicated.

Figure 1:
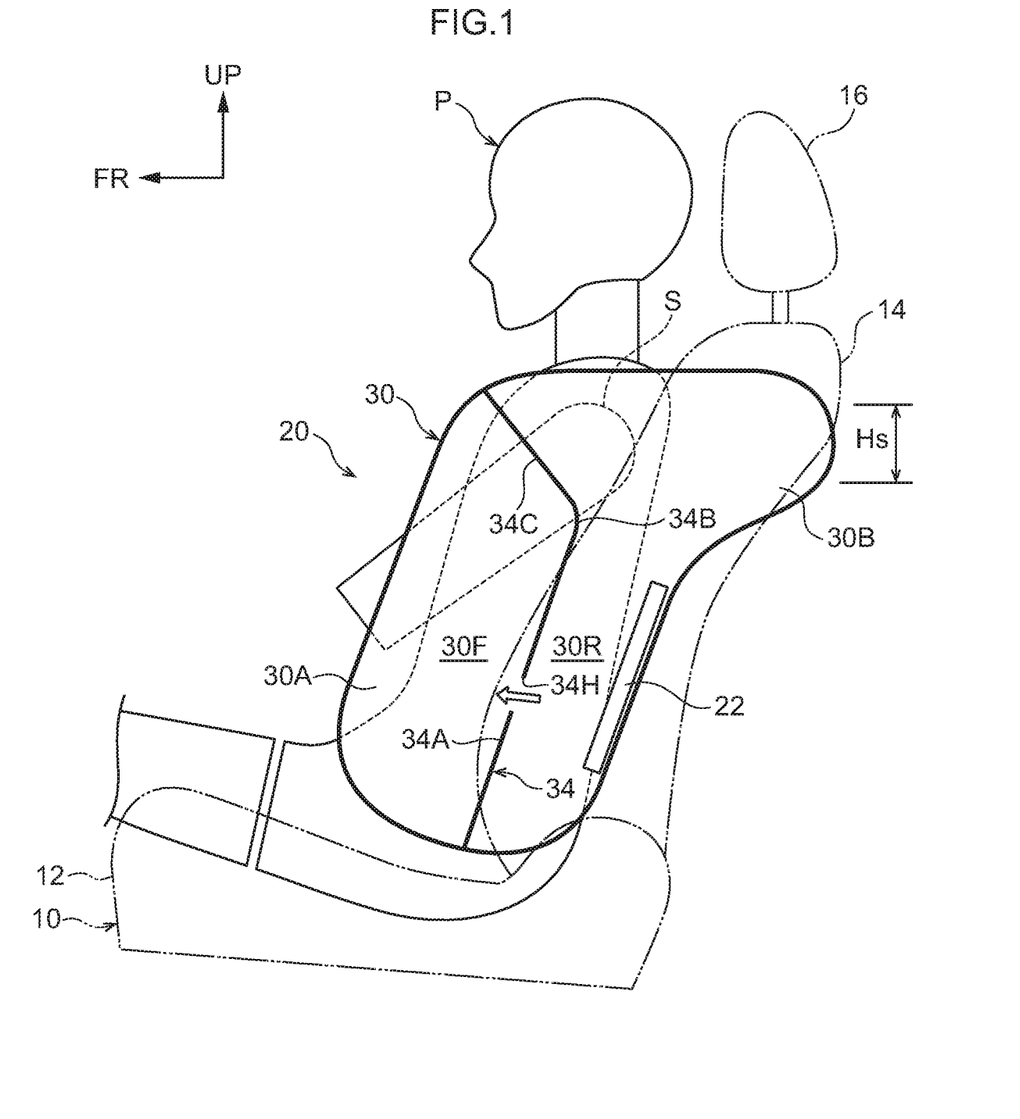
FIG. 1 is a schematic side view showing an airbag device relating to a first exemplary embodiment in a state in which an airbag is inflated and expanded.

As shown in FIG. 1, a vehicle seat 10 that is a front seat has a seat cushion 12, a seatback 14 that is reclinably connected to the rear end portion of the seat cushion 12, and a headrest 16 that is connected to the upper end portion of the seatback 14. The side airbag device 20 is provided within the seatback 14 of the vehicle seat 10.

The vehicle seat 10 is the driver's seat of a left-hand drive vehicle, or is the front passenger's seat of a right-hand drive vehicle, and is disposed at the left side within the vehicle cabin. The longitudinal direction, the left-right direction (the transverse direction) and the vertical direction of the vehicle seat 10 coincide with the longitudinal direction, the left-right direction (the transverse direction) and the vertical direction of the vehicle.

Further, the respective drawings illustrate states in which a crash test dummy P is seated in the vehicle seat 10. The dummy P is an AM50 (50th percentile U.S. adult male) internationally standardized side crash dummy (World Side Impact Dummy: World SID). The dummy D is seated in the vehicle seat 10 in a way of seating that is prescribed by the side crash test method. The longitudinal position of the seat cushion 12 with respect to the vehicle and the angle of tilting of the seatback 14 with respect to the seat cushion 12 are adjusted to standard set positions that correspond to the aforementioned way of seating. There are cases in which the dummy P is called the vehicle occupant P hereinafter.

The seatback 14 of the vehicle seat 10 has a seatback frame (not illustrated), a seatback pad (not illustrated) that covers the seatback frame, and a seatback skin that covers the seatback pad. (In the respective drawings, the seat skin that includes the seatback skin, i.e., the outer shape of the vehicle seat 10, is shown by the two-dot chain line.)

The side airbag device 20 is structured to include an airbag 30 that is formed in the shape of a bag and is folded-up, and an inflator 22 that, by generating gas, causes the folded-up airbag 30 to inflate and expand. The inflator 22 is a cylinder-type inflator 22 and is fixed to the vehicle transverse direction outer side of the seatback frame with the length direction of the inflator 22 being the vertical direction of the seatback 14 (the direction connecting the position connected to the seat cushion 12 and the position connected to the headrest 16 as seen in a side view).

Figure 4:
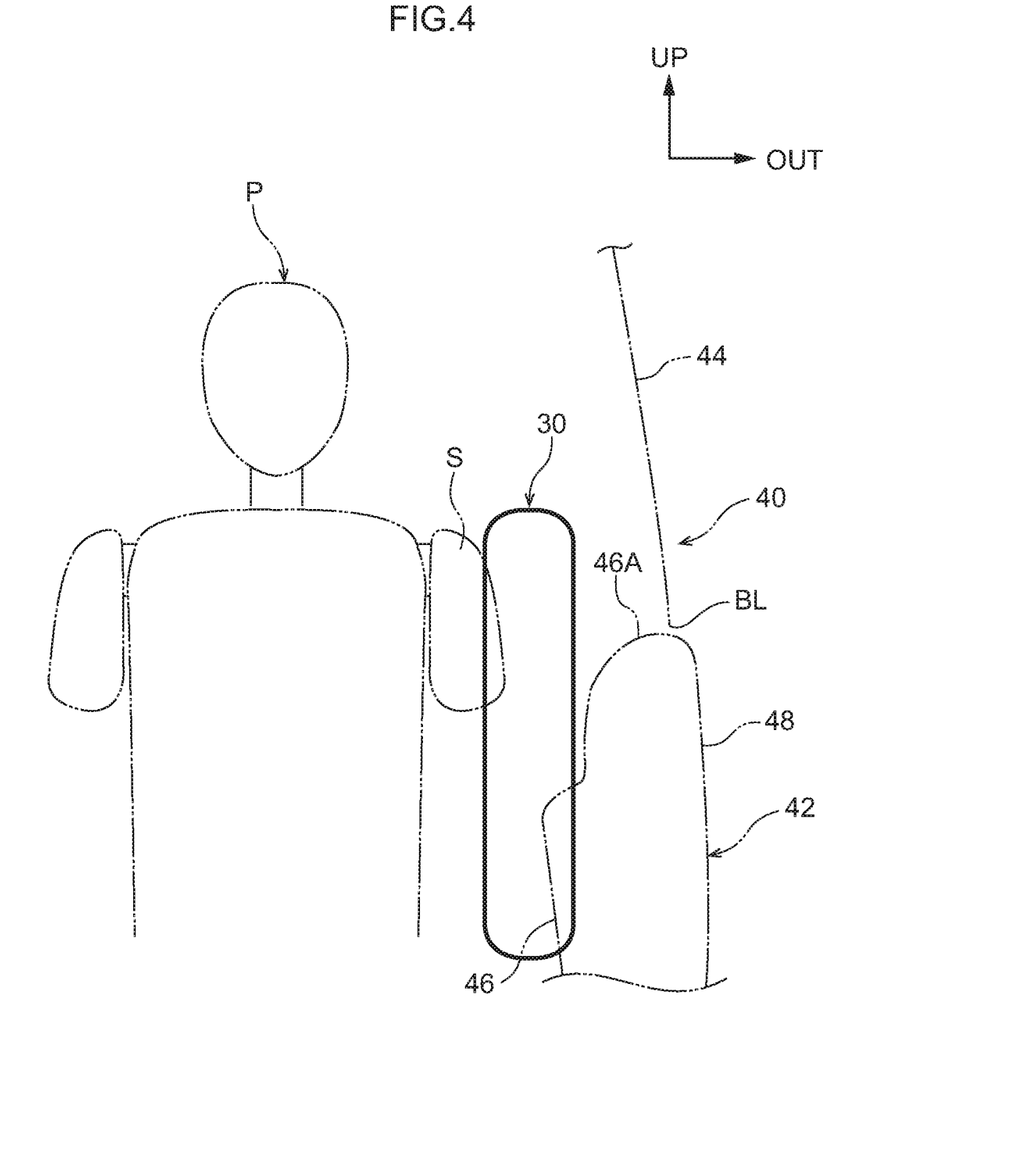
FIG. 4 is a schematic front view showing the inflated and expanded state of the airbag relating to the first exemplary embodiment.

When a side collision occurs, due to the inflator 22 operating and the airbag 30 inflating, the seatback pad and the seatback skin of the seatback 14 are torn, and the airbag 30 inflates and expands. As shown in FIG. 4, the airbag 30 inflates and expands between the vehicle occupant P and a front side door 40, and protects the vehicle occupant P from impact due to the side collision.

Figure 3:
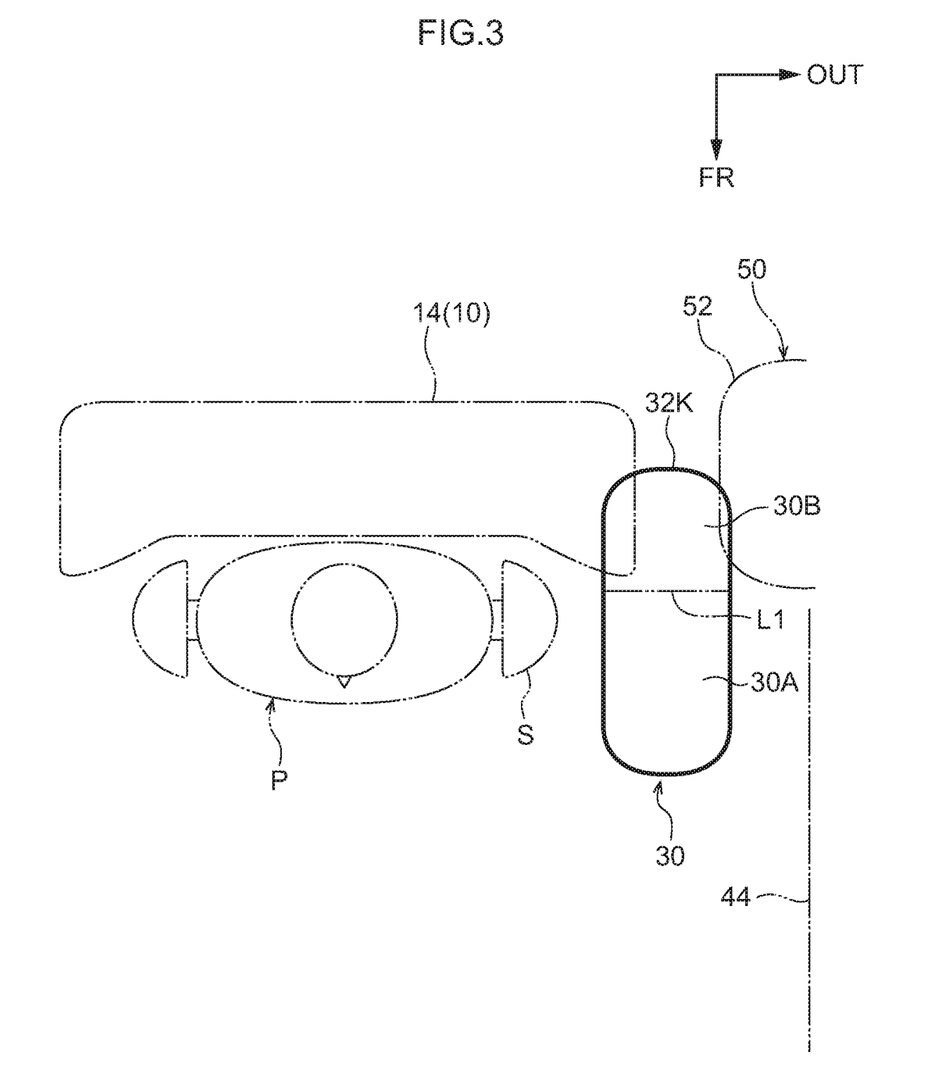
FIG. 3 is a schematic plan view that is seen from a vehicle upper side and shows the inflated and expanded state of the airbag relating to the first exemplary embodiment.

The front side door 40 is disposed between an unillustrated front pillar and a center pillar 50 (B-pillar, see FIG. 3). The center pillar 50 is structured to include a center pillar garnish 52 that structures the design surface at the vehicle cabin side. Although not illustrated, in the state in which the front side door 40 is closed, the center pillar garnish 52 is in a positional relationship of being substantially flush with a door trim 46 that is described later of the front side door 40.

As shown in FIG. 4, the front side door 40 has a door main body 42 that structures the lower portion, and a side door glass 44 that structures the upper portion. The border portion between the door main body 42 and the side door glass 44 (concretely, the borderline that extends along the vehicle longitudinal direction) is called door beltline BL. The door beltline BL is positioned further toward the vehicle lower side than shoulder portion S of the vehicle occupant P seated in the vehicle seat 10.

The door main body 42 has a door outer panel 48 that structures an outer plate of the vehicle, and the door trim 46 that structures the design surface at the vehicle cabin side. Further, although not illustrated, a door inner panel that is joined to the door outer panel 48 is provided between the door outer panel 48 and the door trim 46.

A portion of the lower portion of the side door glass 44 is disposed at the interior of the door main body 42 via a gap between the upper end of the door outer panel 48 and the upper end of the door trim 46. The side door glass 44 extends substantially toward the vehicle upper side from the gap between the upper end of the door outer panel 48 and the upper end of the door trim 46.

A bulging portion 46A that bulges-out toward the vehicle transverse direction inner side is formed in a vicinity of the upper end of the door trim 46. Therefore, the side door glass 44 is in a positional relationship of being recessed toward the vehicle transverse direction outer side with respect to the portion, which is further toward the lower side than the bulging portion 46A, of the door trim 46.

The shape of the airbag 30 that has inflated and expanded is described next.

Note that, when describing the shape of the airbag 30, it means the shape of the airbag 30 that is in the inflated and expanded state, unless otherwise specified. Further, it means the shape in a case that supposes that the airbag 30 inflates and expands without receiving reaction force from other members or the like (a so-called un-restraining state), and not the shape that is a result of receiving reaction force from members that structure the vehicle, the vehicle seat 10, the vehicle occupant P, or the like.

Figure 2:
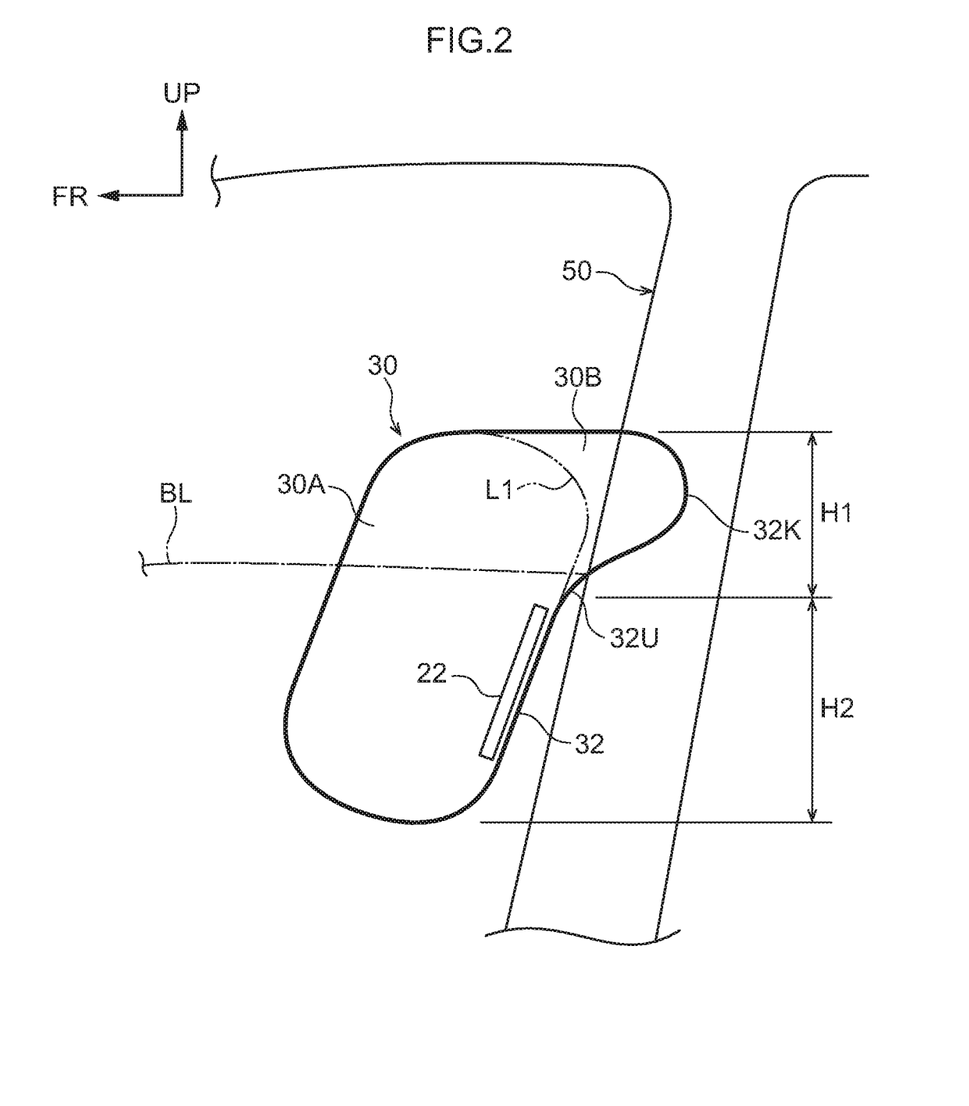
FIG. 2 is a schematic side view that is seen from a vehicle side and shows the inflated and expanded state of the airbag relating to the first exemplary embodiment.

FIG. 1 and FIG. 2 are side views of the airbag 30. As shown in these drawings, the airbag 30 is, overall, a shape that is vertically long as seen in a side view. The airbag 30 is positioned at the side of the shoulder portion S, the chest region and the lumbar region of the seated vehicle occupant P, and restrains the shoulder portion, the chest region and the lumbar region of the seated vehicle occupant P.

Further, as shown in FIG. 2, the airbag 30 is a shape in which extended height region H1 that is at the upper portion of the airbag 30 extends-out toward the vehicle rear side with respect to general height region H2 that is at the lower portion.

Concretely, a rear end portion 32 (the portion that extends in the vertical direction) of the airbag 30 has a concave portion 32U at the height direction intermediate portion thereof. As seen in a side view, the concave portion 32U is a portion at which the rear end portion 32 of the airbag 30 is recessed in an oblique direction (the inner side direction of the airbag 30) that is toward the vehicle frontward side and the vehicle upward side. The portion that is further toward the upper side than the concave portion 32U is the extended height region H1, and the portion that is further toward the lower side than the concave portion 32U is the general height region H2.

Due thereto, an extension portion 30B, which is positioned further toward the vehicle rear side than an imaginary rear end portion (refer to two-dot chain line L1 in FIG. 2) at which the rear end portion 32 of the airbag 30 at the general height region H2 is extended toward the vehicle upper side, is formed at the extended height region H1. Note that the portion of the airbag 30, which is other than the extension portion 30B and which restrains the shoulder portion S, the chest region and the lumbar region of the seated vehicle occupant P, is called main body portion 30A.

FIG. 2 and FIG. 3 are drawings showing the inflated and expanded airbag 30 together with members that structure the vehicle side portion such as the center pillar 50 and the like. As shown in these drawings, of the airbag 30, the extension portion 30B overlaps the center pillar 50 as seen in a side view. Concretely, a rear end 32K (the portion, which is furthest toward the vehicle rear, of the above-described rear end portion 32) of the extension portion 30B is positioned at the longitudinal direction intermediate portion of the center pillar 50, and is a shape that does not protrude-out further toward the vehicle rear than the center pillar 50. On the other hand, the main body portion 30A of the airbag 30 does not overlap the center pillar 50 as seen in a side view.

The airbag 30 is formed as a bag body due to, for example, two base cloths being superposed together and the peripheral edge portions thereof being sewn together. However, the airbag 30 may be formed as a bag body due to a single base cloth being folded in two at the center thereof, and the peripheral edge portion being sewn together. In addition, the method of forming the airbag 30 that is a bag body is not particularly limited.

As shown in FIG. 1, the interior of the airbag 30 is partitioned (sectioned) in the vehicle longitudinal direction into two chambers which are a front chamber 30F and a rear chamber 30R by a front-rear partitioning tether 34 that serves as a "partitioning wall cloth". The front-rear partitioning tether 34 is formed by a piece of a cloth material, which is similar to the base cloth of the airbag 30, being cut-out in the form of an elongated strip. One long side edge portion of the front-rear partitioning tether 34 is sewn to one of the base cloths of the airbag 30, and the other long side edge portion thereof is sewn to the other base cloth of the airbag 30.

The rear portion (concretely, the upper portion and the rear portion) of the rear chamber 30R is the extension portion 30B. Namely, the main body portion 30A, which restrains the shoulder portion S, the chest region and the lumbar region of the seated vehicle occupant P, is structured by the entire front chamber 30F and the front portion of the rear chamber 30R.

The front-rear partitioning tether 34 has a vertically extending portion 34A which extends substantially toward the vehicle upper side (the seatback upper side) from the longitudinal direction intermediate portion of the lower end of the airbag 30, a bent portion 34B that is the upper end of the vertically extending portion 34A and is formed at the vertical direction intermediate portion of the airbag 30, and an inclined portion 34C that extends toward an obliquely front upper side from the bent portion 34B. Further, the portion immediately to the rear of the inclined portion 34C (concretely, the portion that is further toward the front side than an imaginary vertically extending portion if the vertically extending portion 34A were to be extended upward as is) is the portion that restrains the shoulder portion S of the vehicle occupant P. Due thereto, the shoulder portion S of the seated vehicle occupant P is restrained by the rear chamber 30R.

The inflator 22 is disposed within the rear chamber 30R. A communication hole 34H which communicates the rear chamber 30R and the front chamber 30F is formed in the front-rear partitioning tether 34. Therefore, the gas that is generated from the inflator 22 first causes the rear chamber 30R to inflate, and, via the communication hole of the front-rear partitioning tether 34, causes the front chamber 30F to inflate (refer to the white arrow in FIG. 1). Accordingly, the rear chamber 30R is a chamber having higher pressure than the front chamber 30F.

Now, Operation of the present exemplary embodiment is described next.

At the time of a side collision, when, for example, a side collision ECU senses the side collision by a signal from a side collision sensor that the vehicle has, the inflator 22 is operated by the side collision ECU, and the airbag 30 inflates and expands. In the present exemplary embodiment, the airbag 30 that inflates and expands is accommodated within the seatback 14 of the vehicle seat 10, between the seated vehicle occupant P and the front side door 40. The airbag 30 is structured to include the main body portion 30A that restrains at least from the shoulder portion S to the chest region of the seated vehicle occupant.

Moreover, the airbag 30 is structured to include the extension portion 30B. The extension portion 30B is the portion where the airbag 30 is extended toward the vehicle rear side, at a portion (the extended height region H1) of the height region of the main body portion 30A. As shown in FIG. 2, this extension portion 30B overlaps the center pillar 50 as seen in a vehicle side view, at a vehicle occupant shoulder portion height region Hs (the height region corresponding to the shoulder portion S of the vehicle occupant P, see FIG. 1). Accordingly, at the vehicle occupant shoulder portion height region Hs, due to the extension portion 30B, the airbag 30 obtains reaction force from the center pillar 50. Therefore, the vehicle occupant shoulder portion S may be restrained appropriately regardless of breakage of the side door glass 44 or the like.

Further, in the present exemplary embodiment, as shown in FIG. 1, the airbag 30 has the front-rear partitioning tether 34 that sections the interior of the airbag 30 into the front chamber 30F and the rear chamber 30R, and in which the communication hole 34H is formed. Further, the inflator 22 is disposed at the interior of the rear chamber 30R, and the extension portion 30B is structured as a portion of the rear chamber 30R. Therefore, reaction force can be obtained from the center pillar 50 at a portion of the rear chamber that has high pressure, and the vehicle occupant shoulder portion S may be restrained even more effectively.

Moreover, in the present exemplary embodiment, the extension portion 30B is structured as a portion of the rear chamber 30R that has high pressure, and the rear chamber 30R that has high pressure restrains the vehicle occupant shoulder portion S. Namely, of the airbag 30, the portion that restrains the vehicle occupant shoulder portion S, and the portion that receives reaction force from the center pillar 50, are both the chamber that has high pressure (the rear chamber 30R). Therefore, the vehicle occupant shoulder portion S can be restrained even more effectively by the reaction force that is received from the center pillar 50.

Note that, in a case in which the seated vehicle occupant P is a vehicle occupant who corresponds to an AF05 which has a smaller build than the AM50, the position of the vehicle seat 10 is usually a position that is further toward the vehicle front side than in the case of an AM50. However, in the above-described first exemplary embodiment, when the airbag 30 inflates and expands at the position of the vehicle seat 10 in the case of an AF05, the extension portion 30B does not overlap the center pillar 50 (not illustrated). The reason for this is that, differently than in the case of an AM50, in the case of an AF05, the position of the shoulder portion of the seated vehicle occupant is low, and is further toward the vehicle lower side than the door beltline BL. Accordingly, it can be said that, in the above-described exemplary embodiment, while the vehicle occupant shoulder portion S may be restrained appropriately, the volume of the airbag 30 increasing unnecessarily may be suppressed.

However, by changing the size of the extension portion 30B from that of the above-described first exemplary embodiment, at the position (the vehicle longitudinal direction position) of the vehicle seat 10 in a case in which a vehicle occupant corresponding to an AF05 is seated therein, the extension portion 30B and the center pillar 50 may be made to overlap as seen in a vehicle side view. Concretely, it suffices to, at the vehicle occupant shoulder portion height region Hs that corresponds to an AF05, extend the extension portion 30B further toward the vehicle rear side than in the above-described first exemplary embodiment. It should be noted that, in the case of an AF05, the vehicle occupant shoulder portion height region Hs with respect to the vehicle seat 10 is lower than in the case of an AM50.

Further, the above describes an example in which the interior of the side airbag 30 is partitioned in the vehicle longitudinal direction into two chambers that are the front chamber 30F and the rear chamber 30R. However, the side airbag 30 may be a so-called 3-chamber side airbag such as that disclosed in JP-A No. 2014-141159. Namely, the interior of the airbag 30 may be partitioned into a rear chamber, a front chamber and a lower chamber by a partitioning tether. In this case, it is preferable for there to be a structure in which the vehicle occupant shoulder portion is restrained by the rear chamber that has high pressure and in which the inflator 22 is disposed.

Second Exemplary Embodiment

A side airbag device 120 relating to a second exemplary embodiment is described next by using FIG. 5 through FIG. 8. Note that structures that have functions that are substantially the same as those of the first exemplary embodiment are denoted by the same reference numerals in the drawings, and description thereof is omitted.

Figure 8:
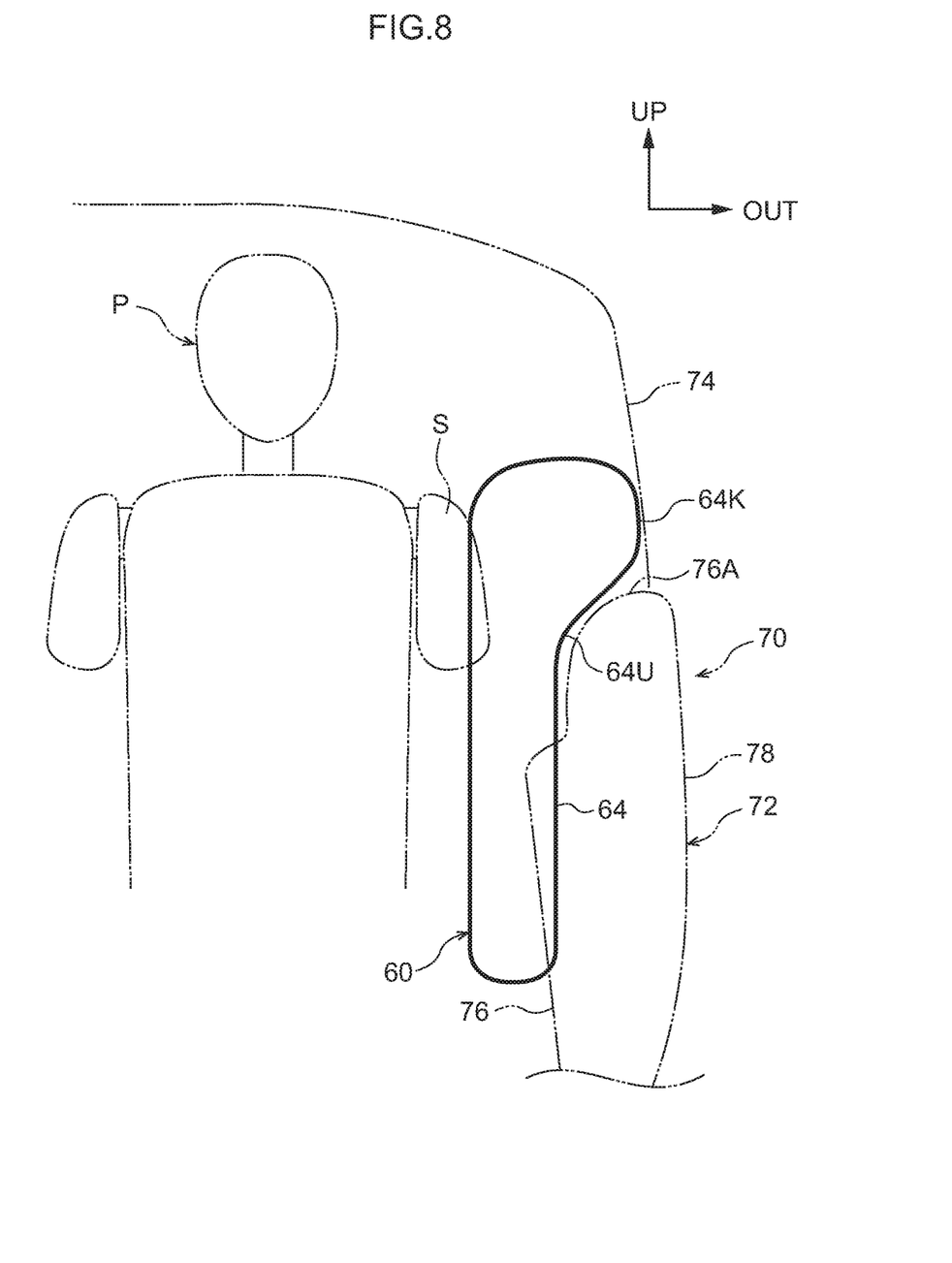
FIG. 8 is a schematic front view showing the inflated and expanded state of the airbag relating to the second exemplary embodiment.

The side airbag device 120 relating to the second exemplary embodiment is provided within a seatback 114 of a vehicle seat 110 that is a rear seat. As shown in FIG. 8, the side airbag device 120 is structured to include an airbag 60 that inflates and expands between the vehicle occupant P seated in the vehicle seat 110 and a rear side door 70, and the inflator 22 (see FIG. 5) that generates gas and causes the folded-up airbag 60 to inflate and expand. The folded-up airbag 60 and the inflator 22 are accommodated within the seatback 114 of the vehicle seat 110.

Figure 6:
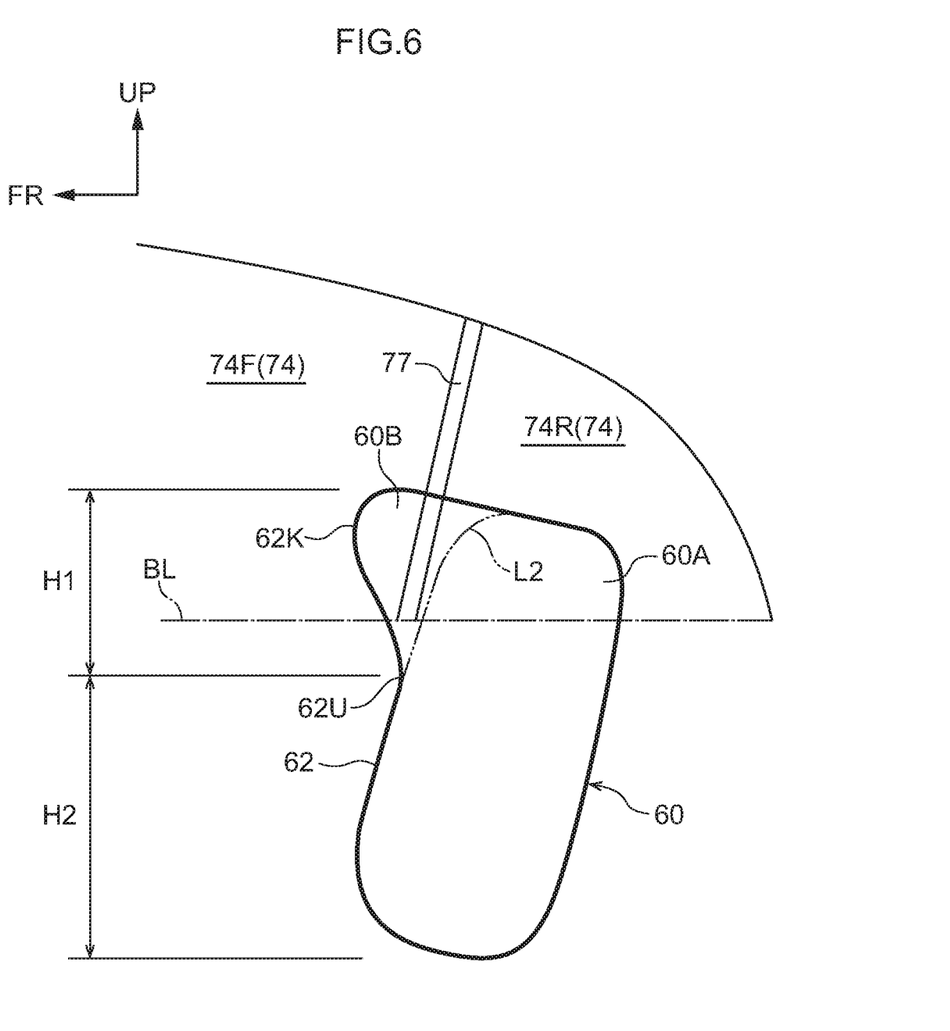
FIG. 6 is a schematic side view showing the inflated and expanded state of the airbag relating to the second exemplary embodiment.
Figure 7:
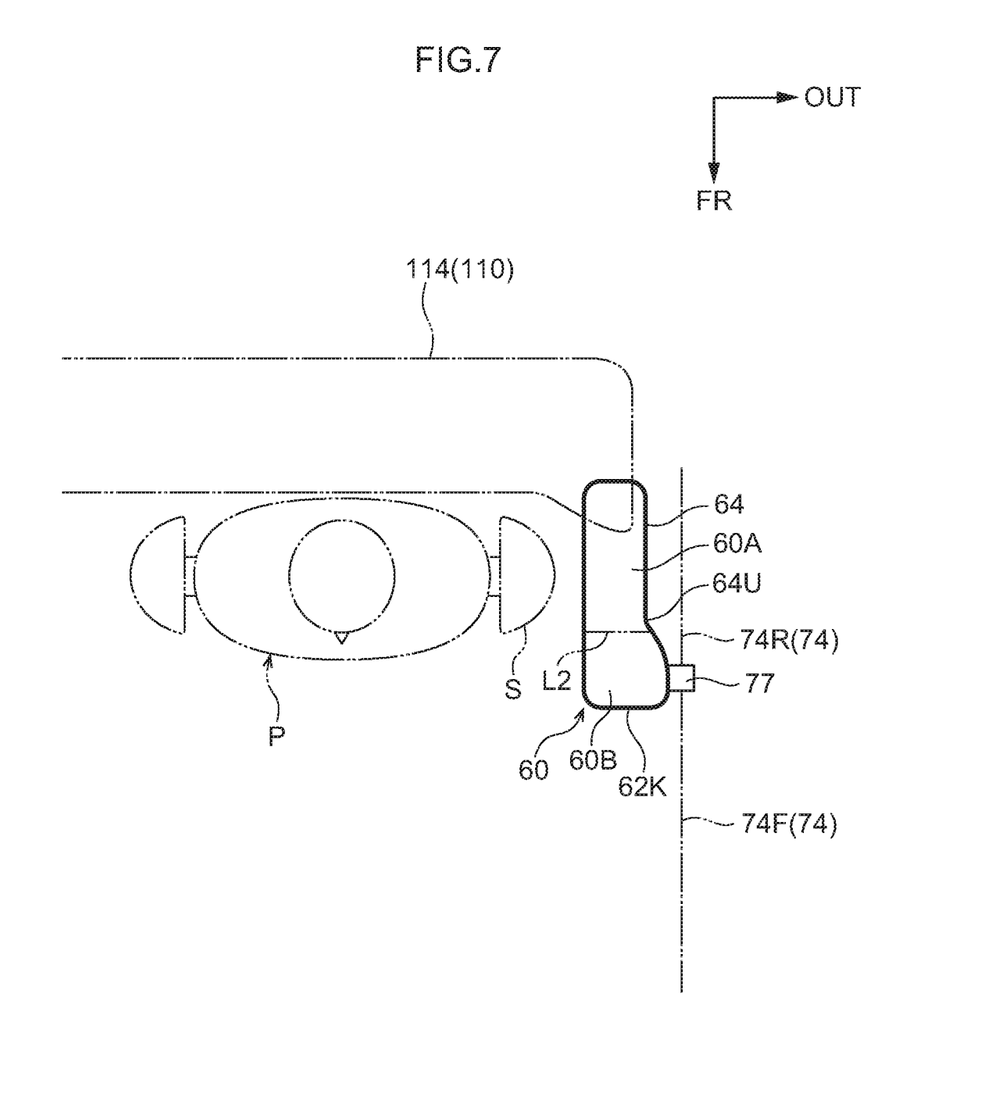
FIG. 7 is a schematic plan view showing the inflated and expanded state of the airbag relating to the second exemplary embodiment.

As shown in FIG. 8, the rear side door 70 has a door main body 72 that structures the lower portion thereof, and a side door glass 74 that structures the upper portion thereof. Further, the rear side door 70 is a so-called sash door, and has a sash (not illustrated) that supports the peripheral edge of the side door glass 74 in the state in which the side door glass 74 is closed. Further, as shown in FIG. 6, the side door glass 74 is structured from a front glass 74F that can open and close, and a rear glass 74R that cannot open and close. The front glass 74F and the rear glass 74R are sectioned by a division bar 77. The division bar 77 supports the rear end of the front glass 74F such that the front glass 74F is slidable in the vertical direction. As shown in FIG. 7, in the state in which the front glass 74F of the side door glass 74 is closed, the division bar 77 protrudes-out slightly more toward the vehicle transverse direction inner side than the vehicle cabin side surface of the side door glass 74.

The door main body 72 is structured to include a door outer panel 78 that structures an outer plate of the vehicle, and a door trim 76 that structures the design surface at the vehicle cabin side. A portion of the lower portion of the side door glass 74 is disposed in the interior of the door main body 72 from a gap between the upper end of the door outer panel 78 and the upper end of the door trim 76. Further, the side door glass 74 extends substantially toward the vehicle upper side from between the upper end of the door outer panel 78 and the upper end of the door trim 76.

A bulging portion 76A that bulges-out toward the vehicle cabin side is formed in a vicinity of the upper end of the door trim 76. Due thereto, the side door glass 74 is in a positional relationship of being recessed toward the vehicle transverse direction outer side with respect to the portion, which is further toward the lower side than the bulging portion 76A, of the door trim 76. Further, the division bar 77 also is in a positional relationship of being recessed toward the vehicle transverse direction outer side with respect to the portion, which is further toward the lower side than the bulging portion 76A, of the door trim 76.

The shape of the airbag 60 of the second exemplary embodiment is described next.

Figure 5:
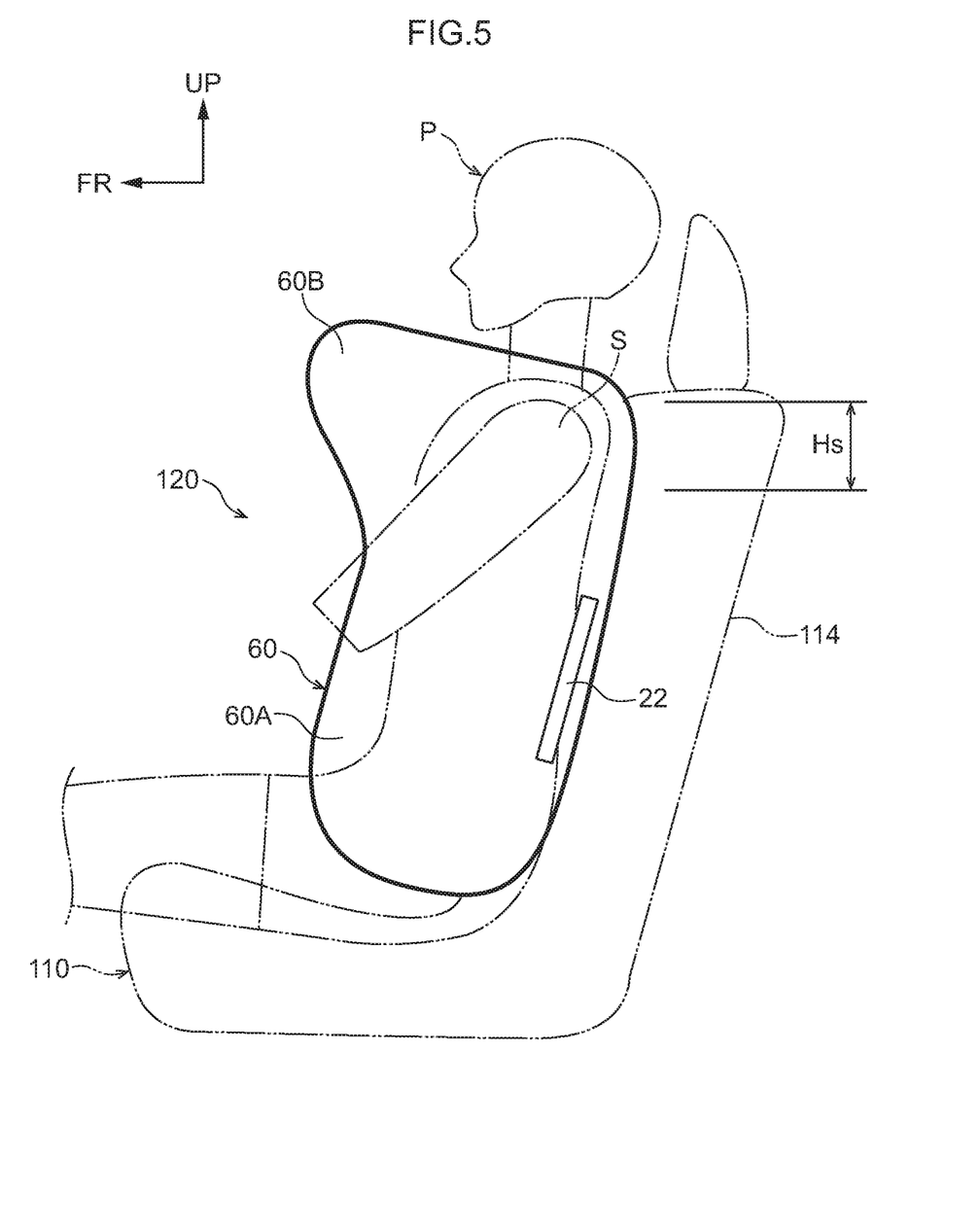
FIG. 5 is a schematic side view showing an airbag device relating to a second exemplary embodiment in a state in which an airbag is inflated and expanded.

FIG. 5 and FIG. 6 are schematic side views of the airbag 60 that has inflated and expanded. Note that, in FIG. 6, illustration of the vehicle seat 110 and the vehicle occupant P and the like is omitted. As shown in these drawings, the airbag 60 is, overall, a shape that is vertically long as seen in a side view. The airbag 60 is positioned at the side of the shoulder portion S, the chest region and the lumbar region of the vehicle occupant P, and restrains the shoulder portion, the chest region and the lumbar region of the vehicle occupant P.

Further, as shown in FIG. 6, the airbag 60 is a shape in which the extended height region H1 that is at the upper portion thereof extends-out toward the vehicle front side with respect to the general height region H2 that is at the lower portion.

Concretely, a front end portion 62 (the portion that extends in the vertical direction) of the airbag 60 has a concave portion 62U at the height direction intermediate portion thereof. As seen in a side view, the concave portion 62U is a portion at which the front end portion 62 of the airbag 60 is recessed in a vehicle rearward and upward oblique direction. The portion that is further toward the upper side than the concave portion 62U is the extended height region H1, and the portion that is further toward the lower side than the concave portion 62U is the general height region H2.

Due thereto, an extension portion 60B, which is positioned further toward the vehicle front side than an imaginary front end portion (refer to two-dot chain line L2 in FIG. 6) at which the front end portion 62 of the airbag 60 at the general height region H2 is extended toward the vehicle upper side, is formed at the extended height region H1.

FIG. 6 and FIG. 7 are drawings showing the inflated and expanded airbag 60 together with members that structure the vehicle side portion such as the division bar 77 and the like. As shown in these drawings, of the airbag 60, the extension portion 60B overlaps the division bar 77 as seen in a side view. Concretely, a front end 62K (the portion, which is furthest toward the vehicle front, of the above-described front end portion 62) of the extension portion 60B is positioned further toward the front than the division bar 77, and the extension portion 60B is a shape that protrudes-out further toward the vehicle front than the division bar 77.

Further, the thickness toward the vehicle transverse direction outer side of the extension portion 60B is greater than that of the main body portion 60A. Concretely, as shown in FIG. 7 and FIG. 8, an outer side surface 64 (the surface facing the vehicle transverse direction outer side) of the airbag 60 has a concave portion 64U at the border portion between the main body portion 60A and the extension portion 60B. As seen in a front view, the concave portion 64U is a portion at which the outer side surface 64 of the airbag 60 is recessed in an oblique direction (the inner side direction of the airbag 60) that is toward the vehicle transverse direction inner side and the vehicle upward side. Due thereto, the thickness of the extension portion 60B is increased toward the vehicle transverse direction outer side to a position at which the extension portion 60B abuts the division bar 77.

Operation of the second exemplary embodiment is described next.

At the time of a side collision, when, for example, the side collision ECU senses the side collision by a signal from a side collision sensor that the vehicle has, the inflator 22 is operated by the side collision ECU, and the airbag 60 inflates and expands. In the present exemplary embodiment, the airbag 60 that inflates and expands is accommodated within the seatback 114 of the vehicle seat 110, between the seated vehicle occupant P and the rear side door 70. As shown in FIG. 5 and FIG. 6, the airbag 60 is structured to include the main body portion 60A that restrains at least from the shoulder portion S to the chest region of the seated vehicle occupant.

Moreover, the airbag 60 is structured to include the extension portion 60B. As shown in FIG. 6, the extension portion 60B is the portion where the airbag 60 is extended toward the vehicle front side, at a portion (the extended height region H1) of the height region of the main body portion 60A. This extension portion 60B overlaps the division bar 77 as seen in a vehicle side view, at the vehicle occupant shoulder portion height region Hs (the region of the height corresponding to the shoulder portion S of the vehicle occupant P, see FIG. 5). Because the airbag 60 obtains reaction force from the division bar 77 at the vehicle occupant shoulder portion height region Hs by the extension portion 60B, the airbag 60 can appropriately restrain the vehicle occupant shoulder portion S.

Further, in the present exemplary embodiment, by providing the extension portion 60B, the "vehicle side portion member" that overlaps the airbag 60 as seen in a side view is the division bar 77 that is positioned at the vehicle front side of the seated vehicle occupant P. The division bar 77 is in a positional relationship of being recessed toward the vehicle transverse direction outer side with respect to the portion, which is further toward the lower side than the bulging portion 76A, of the door trim 76. At the vehicle occupant shoulder portion height region Hs, the thickness, toward the vehicle transverse direction outer side, of the extension portion 60B is greater than that of the main body portion 60A. Therefore, reaction force can be obtained even more appropriately by the vehicle side portion member (the division bar 77) that is in a positional relationship of being recessed toward the vehicle transverse direction outer side with respect to the door trim 76.

[Supplementary Description of Exemplary Embodiments]

Note that the above exemplary embodiments describe examples in which the main body portions 30A, 60A of the airbags 30, 60 restrain the shoulder portion S, the chest region and the waist region of the seated vehicle occupant P. However, the present invention is not limited thereto, and it suffices for the main body portion to restrain at least from the shoulder portion S to the chest region of the seated vehicle occupant P.

Further, the second exemplary embodiment describes an example in which, at the vehicle occupant shoulder portion height region Hs, the thickness of the extension portion 60B toward the vehicle transverse direction outer side is made to be greater than that of the main body portion 60A. However, the present invention is not limited to this, and the thickness of the extension portion 60B does not have to be made greater. In this case as well, reaction force can be obtained from the division bar 77 that is a member that protrudes-out further toward the vehicle inner side than the side door glass 74, and therefore, the vehicle occupant shoulder portion S may be restrained appropriately regardless of breakage of the side door glass 74 or the like.

Further, although description of the interior of the airbag 60 is omitted in the second exemplary embodiment, the airbag 60 may be a so-called 3-chamber airbag such as disclosed in JP-A No. 2014-141159. Namely, the interior of the airbag 60 may be partitioned by a partitioning tether into a rear chamber, a front chamber and a lower chamber.

What is claimed is:

1. A vehicle side airbag device comprising:
an airbag disposed within a seatback of a vehicle seat, the airbag being configured to inflate and expand between a seated vehicle occupant and a side door, the airbag including:
a main body portion configured to restrain at least from a shoulder portion of the seated vehicle occupant to a chest region of the seated vehicle occupant; and
an extension portion configured to extend, at a height region of the main body portion, toward a vehicle rear end, wherein
as seen in a vehicle side view, at a vehicle occupant shoulder portion height region, the extension portion is configured, when the vehicle seat is mounted in a vehicle, to overlap an intermediate portion along a longitudinal length of a pillar disposed at a vehicle rear side of the seated vehicle occupant, the pillar forming a portion of a vehicle cabin side wall and projecting outward further toward a vehicle inner side than a side door glass, a rearward-most end of the extension portion being located forward of a rearward-most portion of the pillar that is overlapped by the extension portion, and the main body portion does not overlap the pillar,
the extension portion is configured so that, when the vehicle seat is mounted in the vehicle, substantially all of the extension portion is located further toward a vehicle upper direction than a door beltline of the vehicle, and
the main body portion is configured so that, when the vehicle seat is mounted in the vehicle, all portions of the main body portion disposed at a region further toward a vehicle lower direction than the door beltline does not overlap with the pillar as seen in the vehicle side view.

2. The vehicle side airbag device of claim 1, wherein the extension portion extends from a vehicle rear side of the main body portion.

3. The vehicle side airbag device of claim 1, wherein the height region of the main body portion from which the extension portion extends is disposed further toward the vehicle upper direction than the door beltline.

4. The vehicle side airbag device of claim 1, wherein the airbag includes a concave portion connecting the extension portion to the main body portion.

5. The vehicle side airbag device of claim 1, wherein:
the airbag includes a partitioning wall cloth dividing an interior of the airbag into a front chamber and a rear chamber, the partitioning wall cloth including a communication hole;
an inflator is disposed at an interior of the rear chamber; and
the extension portion forms a portion of the rear chamber.

6. The vehicle side airbag device of claim 5, wherein the rear chamber is configured to restrain the shoulder portion of the seated vehicle occupant.

7. A vehicle side airbag device comprising:
an airbag disposed within a seatback of a vehicle seat, the airbag being configured to inflate and expand between a seated vehicle occupant and a side door, the airbag including:
a main body portion configured to restrain the seated vehicle occupant from a shoulder portion of the seated vehicle occupant to a chest region of the seated vehicle occupant; and
an extension portion configured to extend, at a height region of the main body portion, toward a vehicle front end,
wherein:
as seen in a vehicle side view, at a vehicle occupant shoulder portion height region, the extension portion is configured, when the vehicle seat is mounted in a vehicle, to overlap a division bar disposed at a vehicle front side of the seated vehicle occupant, the division bar forming a portion of a vehicle cabin side wall and projecting outward further toward a vehicle inner side than a side door glass,
at the vehicle occupant shoulder portion height region, a thickness of the extension portion toward a vehicle transverse direction outer side is greater than a thickness of the main body portion,
the extension portion is configured so that, when the vehicle seat is mounted in the vehicle, substantially all of the extension portion is located further toward a vehicle upper direction than a door beltline of the vehicle, and
a portion of the extension portion disposed at a region further toward the vehicle upper direction than the door beltline has a thickness toward the vehicle transverse direction outer side that is greater than the thickness of all portions of the main body portion.

8. The vehicle side airbag device of claim 7, wherein the main body portion includes a planar front side surface and the extension portion extends in a direction normal to the planar front side surface of the main body portion.

9. The vehicle side airbag device of claim 7, wherein the height region of the main body portion from which the extension portion extends is disposed further toward the vehicle upper direction than the door beltline.

10. The vehicle side airbag device of claim 7, wherein the airbag includes a concave portion connecting the extension portion to the main body portion.

\* \* \* \* \*